(12) United States Patent
Stollman

(10) Patent No.: US 8,464,313 B2
(45) Date of Patent: Jun. 11, 2013

(54) METHODS AND APPARATUS RELATED TO TRANSMISSION OF CONFIDENTIAL INFORMATION TO A RELYING ENTITY

(76) Inventor: Jeff Stollman, Chesterbrook, PA (US)

( * ) Notice: Subject to any disclaimer, the term of this patent is extended or adjusted under 35 U.S.C. 154(b) by 883 days.

(21) Appl. No.: 12/268,065

(22) Filed: Nov. 10, 2008

(65) Prior Publication Data

US 2010/0122315 A1    May 13, 2010

(51) Int. Cl.
*H04L 29/06*    (2006.01)
(52) U.S. Cl.
USPC ............ 726/1; 726/2; 726/3; 726/4; 726/5; 726/6; 713/155; 713/156; 713/157
(58) Field of Classification Search
USPC ................................ 713/150–194; 726/1–36
See application file for complete search history.

(56) References Cited

U.S. PATENT DOCUMENTS

| | | | |
|---|---|---|---|
| 5,521,980 A | 5/1996 | Brands | |
| 5,604,805 A | 2/1997 | Brands | |
| 6,073,106 A * | 6/2000 | Rozen et al. | 705/3 |
| 6,324,645 B1 | 11/2001 | Andrews et al. | |
| 6,463,417 B1 | 10/2002 | Schoenberg | |
| 6,581,059 B1 * | 6/2003 | Barrett et al. | 1/1 |
| 6,718,470 B1 | 4/2004 | Adams | |
| 6,816,965 B1 | 11/2004 | Moore et al. | |
| 6,928,428 B1 | 8/2005 | Vries | |
| 7,073,195 B2 | 7/2006 | Brickell et al. | |
| 7,249,374 B1 | 7/2007 | Lear et al. | |
| 7,290,138 B2 | 10/2007 | Freeman et al. | |
| 7,299,504 B1 | 11/2007 | Tiller et al. | |
| 7,302,591 B2 | 11/2007 | Oliver et al. | |
| 7,308,706 B2 | 12/2007 | Markham et al. | |
| 7,350,226 B2 | 3/2008 | Moriconi et al. | |
| 7,457,950 B1 | 11/2008 | Brickell et al. | |
| 7,865,959 B1 | 1/2011 | Lewis | |
| 2002/0083014 A1 | 6/2002 | Brickell et al. | |
| 2003/0120610 A1 | 6/2003 | Hamber | |
| 2003/0163686 A1 | 8/2003 | Ward et al. | |
| 2003/0172090 A1 | 9/2003 | Asunmaa et al. | |
| 2004/0111622 A1 * | 6/2004 | Schoenberg | 713/182 |
| 2004/0128546 A1 | 7/2004 | Blakley et al. | |
| 2004/0205342 A1 | 10/2004 | Roegner | |
| 2005/0066010 A1 * | 3/2005 | Treville | 709/207 |
| 2005/0193204 A1 | 9/2005 | Engberg et al. | |
| 2005/0288939 A1 | 12/2005 | Peled et al. | |

(Continued)

FOREIGN PATENT DOCUMENTS

| | | |
|---|---|---|
| EP | 1 026 867 A2 | 8/2000 |
| WO | WO 2008/013525 A1 | 1/2008 |

OTHER PUBLICATIONS

Krishna, P. Radha et al., An ER(EC) Framework for e-Contract Modeling, Enactment and Monitoring, Data Knowledge Engineering, vol. 51, No. 1, Oct. 2004, pp. 31-58.

(Continued)

*Primary Examiner* — Longbit Chai
(74) *Attorney, Agent, or Firm* — Cooley LLP

(57) ABSTRACT

In one embodiment, a method includes defining a request for confidential information from a domain of confidential information based on an input from a relying entity. The domain of confidential information can be associated with a subject entity. A response to the request can be defined at an information provider. The method can also include sending the response to the relying entity when the response has been approved by the subject entity.

35 Claims, 8 Drawing Sheets

U.S. PATENT DOCUMENTS

| | | | |
|---|---|---|---|
| 2006/0129817 A1 | 6/2006 | Borneman et al. | |
| 2007/0101400 A1* | 5/2007 | Freeman et al. | 726/2 |
| 2007/0143855 A1 | 6/2007 | Gilchrist et al. | |
| 2007/0226790 A1 | 9/2007 | Maher et al. | |
| 2007/0268922 A1 | 11/2007 | Dougan et al. | |
| 2008/0046984 A1 | 2/2008 | Bohmer et al. | |
| 2008/0066181 A1 | 3/2008 | Haveson et al. | |
| 2008/0080372 A1 | 4/2008 | Cai et al. | |
| 2008/0109871 A1 | 5/2008 | Jacobs | |
| 2009/0216725 A1* | 8/2009 | Yaqub | 707/3 |

OTHER PUBLICATIONS

Schoop, Mareike, A Language-Action Approach to Electronic Negotiations, Systems, Signs & Actions—An International Journal on Communication, Information Technology and Work, vol. 1, No. 1, 2005, pp. 62-79.

Narendra Nanjangud C., Generating Correct Protocols from Contracts: A Commitment-Based Approach, Congress on Services—Part I, 2008, Services '08. IEEE, Jul. 6, 2008, pp. 407-414.

International Search Report and Written Opinion of the International Searching Authority for PCT/US2009/63801 issued Jul. 28, 2010, 10 pp.

Office Action mailed Jun. 21, 2011 for U.S. Appl. No. 12/236,257, 8 pp.

Office Action mailed Sep. 13, 2012 for U.S. Appl. No. 12/268,069, filed Nov. 10, 2008.

Office Action mailed Dec. 21, 2011 for U.S. Appl. No. 12/268,069, filed Nov. 10, 2008.

* cited by examiner

METHODS AND APPARATUS RELATED TO TRANSMISSION OF CONFIDENTIAL INFORMATION TO A RELYING ENTITY

BACKGROUND

Embodiments relate generally to management of confidential information, and, in particular, to methods and apparatus related to transmission of confidential associated with a subject entity to a relying entity.

In societies with electronic-enabled economies, relatively large numbers of transactions take place among parties who have limited knowledge about one another. When parties engage in a transaction, a party (also referred to as a relying party) may hope to acquire specified information (e.g., confidential information, personally identifiable information) about another party (also referred to as a subject party) to facilitate and/or enable the transaction. A relying party may wish to acquire information such as:
 (1) Will the bank or credit card account of the subject party cover the purchase of goods and/or services by the subject party?
 (2) Is the subject party a reasonable credit risk for a proposed mortgage or new line of credit?
 (3) Is there anything in the medical history of the subject entity that may change a diagnosis?

Answers to these types of questions can be obtained by the relying party through, for example, electronic records of previous transactions and/or through a third-party information provider such as a credit bureau. In some cases, answers to these questions can be obtained with relative ease by a party with payment of a fee. Often, the information collected by, for example, information providers can be collected without the assent of the subject party and/or can include errors which can have a detrimental impact on the subject party and/or the relying party. Additionally, breaches of information repositories maintained by relying parties and/or information providers can result in information being undesirably exposed.

Among the unintended consequences of the widespread availability of information, such as personally identifiable information, either through purchase, accidental exposure, and/or theft has led to, for example, the undesirable exploitation of such information for criminal purposes (e.g., identity theft). This type of exploitation can be a financial and/or an emotional burden on the subject of the exposed information. Although certain organizations, such as government agencies, are beginning to enact rules and/or regulations to protect information and/or promote the availability of information so that information can be readily transferred between parties, these efforts have many short-comings. Thus, a need exists for methods and apparatus related to transmission of confidential information associated with a subject party to a relying party.

SUMMARY

In one embodiment, a method includes defining a request for confidential information from a domain of confidential information based on an input from a relying entity. The domain of confidential information can be associated with a subject entity. A response to the request can be defined at an information provider. The method can also include sending the response to the relying entity when the response has been approved by the subject entity.

DETAILED DESCRIPTION

Figure 1:
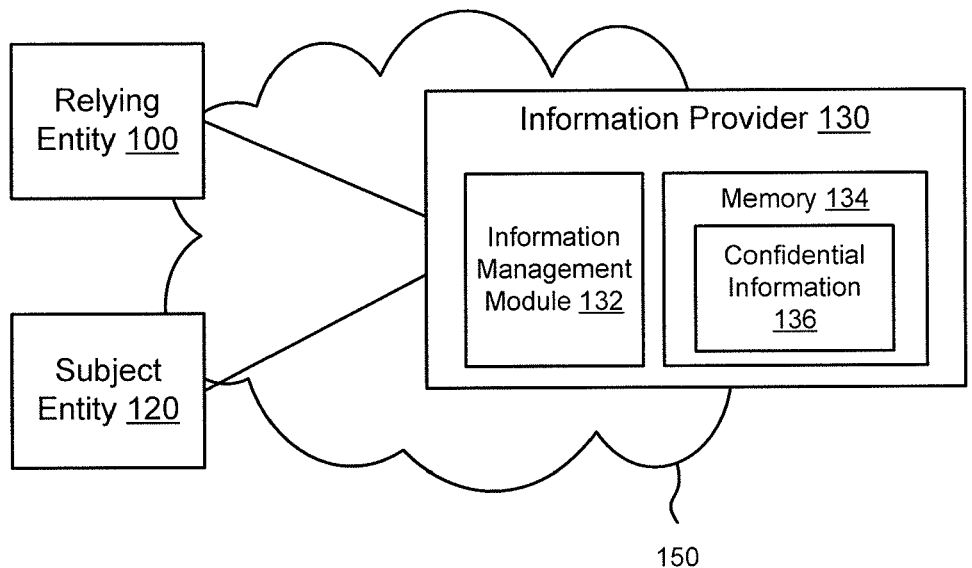
FIG. 1 is a schematic block diagram that illustrates an information provider configured to send at least a portion of confidential information associated with a subject entity to a relying entity, according to an embodiment.

An information management module can be configured to manage processing (e.g., handling, transmission, updating) of confidential information associated with one or more entities (e.g., individuals, businesses, organizations, an agent (e.g., a human agent, an electronic agent) of an individual/business/organization). Specifically, the information management module can be configured to manage transfer of confidential information associated with a subject entity to a relying entity. In some embodiments, the subject entity can be referred to as subject entity because the confidential information can be related to (e.g., owned by, about, created by) the subject entity. In some embodiments, the subject entity can be referred to as a subject party. The relying entity can be any entity that is attempting to obtain confidential information associated with the subject entity. In some embodiments, the relying entity can be referred to as a relying party.

The confidential information can be requested by the relying entity via the information management module. A request for the confidential information and/or a response (e.g., a proposed response) to the confidential information can be reviewed by the subject entity before the response is sent to the relying entity. Moreover, the subject entity can have the opportunity to assess the accuracy/appropriateness of the request and/or the confidential information included in the response to the request. In some embodiments, the request can be defined based on one or more predefined queries and the request can be a request for confidential information from a domain of confidential information.

In some embodiments, the information management module can be configured so that the subject entity can modify, approve, and/or disapprove one or more portions of a request and/or a response to the request for confidential information via the information management module. In some embodiments, the subject entity and/or the relying entity can negotiate transfer of confidential information via the information management module. In some embodiments, a request for confidential information can be defined (e.g., automatically defined) based on a request policy defined by the subject entity and/or defined by the relying entity. The request policy defined by the subject entity can be configured to trigger updates (e.g., automatic updates) of confidential information associated with the subject entity. The request policy defined by the relying entity can be used by, for example, an information management module to define (e.g., automatically define) a request for confidential information. In some embodiments, a response to the confidential information can be defined based on a response policy defined by the subject entity and/or the relying entity. In some embodiments, the response policy can be defined so that a desirable level of confidential information (e.g., a minimal level, a specified level) is shared with a relying entity. In some embodiments, transactions related to the information management module, the relying entity, and/or the subject entity can be tracked (e.g., collected, stored) by the information management module.

In some embodiments, the confidential information associated with an entity (e.g., a subject entity) can include, for example, personal identifiable information (e.g., a social security number, a birth date, a marriage date, residential information), medical information (e.g., a health history, diagnostic information), financial information (e.g., credit information, bank account information), account information (e.g., e-mail account information, membership information), behavioral information (e.g., habit information), characteristics related to an individual (e.g., biometric information), transactional information (e.g., transaction dates), location information (e.g., current location information), employee information (e.g., salary information, employment history), criminal information (e.g., a criminal history), license information (e.g., information related to a vehicle/hunting/medical license or building permit), security clearance information (e.g., information about a level of security clearance), citizenship information (e.g., an immigration status), and so forth. In some embodiments, the confidential information can be textual information (e.g., a document), graphical information (e.g., a chart/table), audible information (e.g., a sound byte), visual information (e.g., an image, a video), and so forth. In some embodiments, the confidential information can include secret information and/or publicly available information.

It is noted that, as used in this written description and the appended claims, the singular forms "a," "an" and "the" include plural referents unless the context clearly dictates otherwise. Thus, for example, the term "a request" is intended to mean a single request or multiple requests.

FIG. 1 is a schematic block diagram that illustrates an information provider 130 configured to send at least a portion of confidential information 136 associated with a subject entity 120 to a relying entity 100, according to an embodiment. As shown in FIG. 1, the information provider 130 includes an information management module 132 configured to manage processing of the confidential information 136.

The information management module 132 can be configured to send (or trigger sending of) a portion of confidential information 136 in response to a request defined by the relying entity 100. In some embodiments, one or more portions of a request for at least a portion of the confidential information 136 can be processed by (e.g., approved by, modified by, disapproved by) the subject entity 120 and/or the relying entity 100 via the information management module. In some embodiments, the request for at least a portion of the confidential information 136 can be referred to as a confidential information request or as an information request.

In some embodiments, the portion of the confidential information 136 can be sent in response to request being processed by (e.g., approved by, modified by, disapproved by) the subject entity 120 via the information management module. For example, the information management module 132 can be configured to send the portion of confidential information 136 in response to at least a portion of the confidential information request and/or responses (e.g., proposed responses) to the confidential information request being approved by the subject entity 120. In some embodiments, the information management module 132 can also be configured to only send the portion of the confidential information 136 when the sending of the portion of the confidential information 136 is approved by the subject entity 120.

For example, a request for a first portion of the confidential information 136 and a second portion of the confidential information 136 can be sent from the relying entity 100 to the subject entity 120. The information management module 132 can be configured to send the first portion of the confidential information 136 when the subject entity 120 only authorizes a response to a portion of the request related to the first portion of the confidential information 136 (or prohibits a response to a portion of the request related to the second portion of the confidential information 136).

In some embodiments, the information management module 132 can be configured to send the first portion of the confidential information 136 in a form that is authorized by the subject entity 120. In some embodiments, the information management module 132 can be configured to send the first portion of the confidential information 136, for example, in a format, via a protocol, with specified language, and so forth, that is authorized by the subject entity 120.

In some embodiments, the confidential information request can be defined based on one or more predefined queries that can be selected by the relying entity 200. The predefined queries can be provided to the relying entity 200 based on one or more preferences (included in a request policy) defined by the subject entity 220. A predefined query can be a predefined question related to confidential information about the subject entity 220. More details related to predefined queries are described in connection with FIG. 3.

The relying entity 100 can be any entity that can define a request for at least a portion of the confidential information 136 and/or trigger the information management module 132 to define such a request. For example, the relying entity 100 can be, or can be associated with, a computing device such as a mobile device, a personal digital assistant (PDA), a server, a personal computer, and so forth. In some embodiments, for example, the relying entity 100 can be, or can be associated with, an organization (e.g., a corporation), an individual, a group of individuals, and so forth.

The subject entity 120 can be any entity that can be configured to process (e.g., respond to, approve, modify, disapprove) a request for at least a portion of the confidential information 136. For example, the subject entity 120 can be or can be associated with a computing device such as a mobile device, a PDA, a server, a personal computer, and so forth. In some embodiments, for example, the subject entity 120 can be or can be associated with an organization (e.g., a corporation), an individual, a group of individuals, and so forth.

As shown in FIG. 1, the confidential information 136 can be stored in a memory 134 that can be accessed by the information provider 130. In some embodiments, the confidential information 136 can be stored in any storage medium that can be accessed by the information provider 130. For example, although not shown, the confidential information 136 can be stored in a database, a remote database, a local database, a distributed database, and so forth.

Although not shown, the confidential information 136 can be associated with one or more subject entities in addition to subject entity 120. In some embodiments, the confidential information 136 can define, can include, and/or can be from a domain of confidential information that can be defined by the relying entity 100, the information management module 132, and/or the subject entity 120. In some embodiments, the domain of confidential information 136 can be defined based on one or more preferences (e.g., preferences included in a request policy and/or a response policy) of the relying entity 100 and/or the subject entity 120.

In some embodiments, a domain of confidential information can be a subset of a group of confidential information associated with a subject entity. In some embodiments, a domain of confidential information can be a subset of confidential information that a relying entity may be permitted to access or request. In some embodiments, a relying entity may be permitted to request only confidential information from a specified domain of confidential information. In some embodiments, a domain of confidential information can include all confidential information associated with a subject entity or set of subject entities. More details related to defining a domain of confidential information are described in connection with FIGS. 4-8.

In some embodiments, an identity of the subject entity 120 and/or an identity of the relying entity 100 can be authenticated at the information management module 132 of the information provider 130. The identity of the subject entity 120 and/or the identity of the relying entity 100 can be authenticated based on one or more digital certificates, username/password combinations, possession of a credential(s) (e.g., token(s)), characteristic information (e.g., biometric information), and/or so forth. More details related to authentication based on a credential are set forth in U.S. patent application publication No. 2010/0116880, filed Nov. 10, 2008, entitled "Methods and Apparatus for Transacting with Multiple Domains based on a Credential," which is incorporated herein by reference in its entirety.

In some embodiments, the identity of the relying entity 100 can be authenticated at the information management module 132 before a request is received at the information management module 132 from the relying entity 100. In some embodiments, the relying entity 100 can be prevented from making a request for a portion of the confidential information 136 unless the identity of the relying entity 100 has been authenticated. In some embodiments, the relying entity 100 can be prevented from making a request for a portion of the confidential information 136 unless the identity of the relying entity 100 has been authenticated based on a specified level of authentication (e.g., authentication using a username/password combination as well as biometric verification). In some embodiments, this can be referred to as satisfying an authentication level.

In some embodiments, the identity of the subject entity 120 can be authenticated at the information management module 132 before the subject entity 120 can have access to a request for a portion of the confidential information 136. In some embodiments, the identity of the subject entity 120 can be authenticated at the information management module 132 before the subject entity 120 can be allowed to approve, disapprove, and/or modify a request (or proposed response to the request) for a portion of the confidential information 136. In some embodiments, the subject entity 120 can be prevented from, for example, reviewing a request unless the identity of the subject entity 120 has been authenticated based on a specified level of authentication (e.g., authentication using a username/password combination as well as biometric verification). In some embodiments, this can be referred to as satisfying an authentication level.

In some embodiments, a request for at least a portion of the confidential information 136 can be defined based on a request policy. Although not shown, the request policy can be stored at the memory 134. The request policy can be configured to trigger the information management module 132 to request and/or send at least a portion of the confidential information 136 to the relying entity 100. In some embodiments, the request policy can be configured to trigger one or more portions of the confidential information 136 to be sent (e.g., sent by the information management module 132) to the relying entity 100 at specified times, at regular times, and/or at random times. In some embodiments, the request policy can be configured to trigger the information management module 132 to send one or more portions of the confidential information 136 in response to the confidential information 136 (e.g., the portion of the confidential information 136) being changed (e.g., updated, modified).

In some embodiments, one or more portions of the confidential information 136 queued for sending to the relying entity 100 based on a request policy cannot be sent to the relying entity 100 until approved by the subject entity 120. In some embodiments, only portions of the confidential information 136 approved (e.g., authorized) for sending by the subject entity 120 will be sent to the relying entity 100 (or not approved for sending by the subject entity 120 will not be sent to the relying entity 100).

In some embodiments, one or more portions of a request policy can be invoked by the information management module 132 and/or the relying entity 100. For example, the relying entity 100 can be configured to trigger the information management module 132 to send at least a portion of the confidential information 136 based on one or more portions of a request policy stored at, for example, the memory 134. In some embodiments, one or more portions of a request policy can be manually invoked by the information management module 132 and/or the relying entity 100.

In some embodiments, one or more portions of a request from a relying entity 100 can be automatically approved, disapproved, and/or modified based on response policy. The response policy can be defined by the subject entity 120 (also can be referred to as a subject entity response policy) and can be stored at, for example, the memory 134. The response policy can be configured so that specific types of requests for the confidential information 136 are handled in a particular fashion. For example, a response policy can be defined so that a specified type of request for confidential information 136 (e.g., a request for birth date information) is automatically rejected based on the response policy. In some embodiments, a response policy can be defined so that a response to a specified type of request for confidential information 136 is always (or under specified conditions) authorized based on the response policy. In some embodiments, a response policy can be defined so that one or more portions of a request is modified based on the response policy when specified conditions within the response policy are satisfied.

In some embodiments, the response policy can be defined so that one or more portions of the confidential information 136 are not shared (or are shared) with a particular party based on a privacy level associated with the portion(s) of confidential information 136. For example, transmission to the relying entity 100 of a particular portion of the confidential information 136 that has a specified privacy level may not permitted based on a response policy defined by the subject entity 120. In some embodiments, the transmission may (or may not) be permitted based on, for example, a trust-level value (e.g., an assurance level value, a security clearance level) and/or an identity of the relying entity 100.

In some embodiments, a response policy can be defined by the relying entity 100 (also can be referred to as a relying entity response policy). The response policy can be configured to trigger the information management module 132 to define a response to a request from the relying entity 100 in a particular fashion when specified conditions are met. For example, the information management module 132 can be configured to send a response to a request in a particular form (e.g., via e-mail) based on a response policy defined by the relying entity 100 and/or based on a particular type of request (e.g., a request for a specified type of confidential information).

In some embodiments, a response policy can be defined based on an identity of the relying entity 100. Moreover, a response policy can be applied to more than one relying entity. For example, a response policy can be configured to authorize, modify, and/or deny one or more portions of a specified set (or type) of confidential information requests from a specified relying entity such as relying entity 100.

In some embodiments, transactions related to the information management module 132, the relying entity 100, and/or the subject entity 120 can be tracked (e.g., collected, stored) by the information management module 132. For example, request made by the relying entity 100, approvals by the subject entity 120, confidential information sent by the information management module, etc. can be tracked. In some embodiments, the tracked transactions can be stored at, for example, the memory 134. In some embodiments, the tracked transactions can collectively (or individually) define an audit trail that can be accessed and/or analyzed. In some embodiments, the tracked data can be automatically transferred (e.g., transferred at specified times, transferred in a specified format) to the relying entity 100, the subject entity 120, and/or the information provider 130 based on one or more tracking policies defined by the relying entity 100, the subject entity 120, and/or the information provider 130.

In some embodiments, the tracked data can be accessed by the relying entity 100 so that the relying entity 100 can verify (e.g., prove) that one or more portions of the confidential information 136 received by the relying entity 100 was transferred from a reliable source and with proper approval from the subject entity 120. For example, a digital signature stamp associated with approval by the subject entity 120 of transfer of confidential information 136 can be stored in a memory (not shown) that can be accessed by the relying entity 100.

In some embodiments, tracked data can be accessed by the information provider 130 so that the information provider 130 can verify (e.g., prove) the information provider 130 properly released the confidential information 136 to the relying entity 100. For example, when the information provider 130 transfers at least a portion of the confidential information 136 to the relying entity 100, one or more portions of tracked data (e.g., tracked data values) representing the type, quantity, and/or date/time of the transfer of the portion of the confidential information 136 can be stored in a memory (not shown). The tracked data can be retrieved by the information provider 130 to verify the proper release of the portion of the confidential information 136 to the relying entity 100 in accordance with, for example, a preference established by, for example, the subject entity 120 and/or the relying entity 100.

In some embodiments, tracked data can be accessed by the subject entity 120 so that the subject entity 120 can verify (e.g., prove) that one or more portions of the confidential information 136 were properly released by, for example, the information provider 130 to the relying entity 100. For example, when the information provider 130 transfers at least a portion of the confidential information 136 to the relying entity 100, one or more portions of tracked data (e.g., tracked data values) representing the transaction related to the transfer of the portion of the confidential information 136 can be stored in a memory (not shown). The tracked data can be retrieved by the subject entity 120 to verify the proper release of the portion of the confidential information 136 to the relying entity 100 in accordance with, for example, a preference established by, for example, the subject entity 120 and/or the relying entity 100.

In some embodiments, any portion of the information provider 130 (e.g., the information management module 132) can be a hardware-based module (e.g., a digital signal processor (DSP), a field programmable gate array (FPGA)) and/or a software-based module (e.g., a module of computer code, a set of processor-readable instructions that can be executed at a processor). In some embodiments, one or more of the functions associated with the information provider 130 can be included in different modules and/or combined into one or more modules (that can be associated with one or more entities).

Although not shown, the information management module 132 can be accessed by the subject entity 120 and/or the relying entity 100, for example, via a user interface (e.g., a graphical user interface) at, for example, a terminal device (e.g., a kiosk, a computing device). In some embodiments, the user interface can be included in, for example, a terminal device associated with the information provider 130. In some embodiments, any portion of the information provider 130 (e.g., the information management module 132) can be, for example, a distributed application and/or a web-based application. In some embodiments, for example, the information management module 132 can be a distributed web-based application that can have one or more portions served from, for example, one or more servers (not shown). In some embodiments, the server(s) can be associated with the subject entity 120, the relying entity 100, and/or a third party (not shown). In some embodiments, for example, the information management module 132 can be accessed via an application programming interface (API). In some embodiments, the relying entity 100 and/or the subject entity 120 can have one or more applications that can be used to access and/or communicate with the information management module 132.

In some embodiments, the network 150 can be, for example, a local area network (LAN), a wide area network (WAN), a virtual network. In some embodiments, the network 150 can be wired network and/or wireless network. The relying entity 100 and/or the subject entity 120 can be configured to communicate with the information provider 130 via one or more protocols (e.g., Internet Protocol, wireless protocol, session control protocol)

Figure 2:
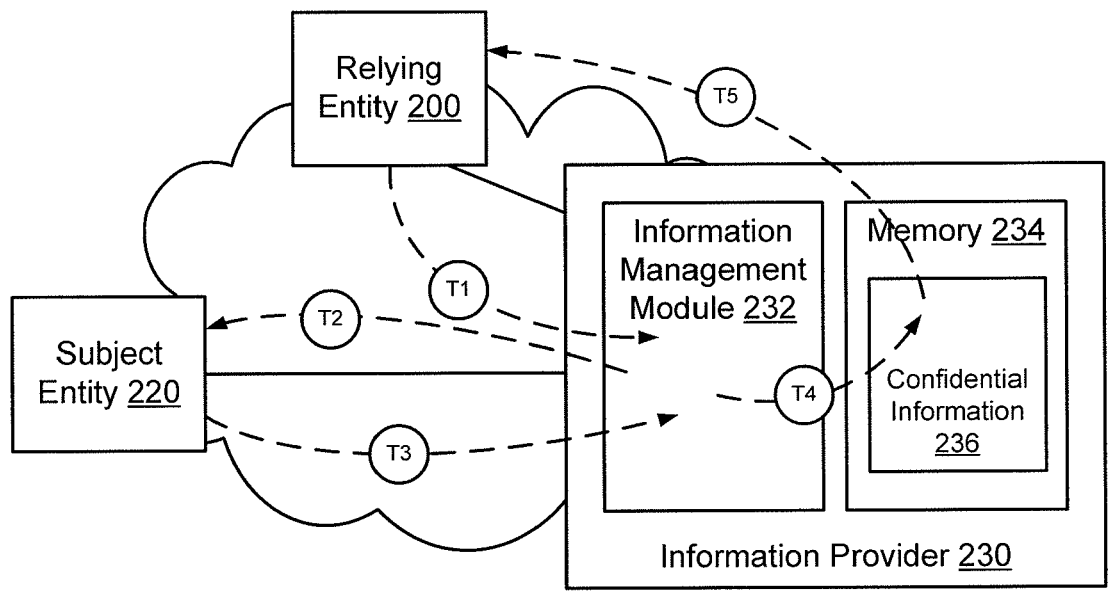
FIG. 2 is a schematic block diagram that illustrates signaling related to transfer of at least a portion of confidential information associated with a subject entity to a relying entity, according to an embodiment.

FIG. 2 is a schematic block diagram that illustrates signaling related to transfer of at least a portion of confidential information 236 associated with a subject entity 220 to a relying entity 200, according to an embodiment. As shown in FIG. 2, an information provider 230 includes an information management module 232 configured to manage signaling associated with the transfer of the portion of the confidential information 236. In some embodiments, the confidential information 236 can include, can define, and/or can be from a domain of confidential information.

As shown in FIG. 2, the information management module 232 is configured to receive from the relying entity 200 one or more signals (line T1) configured to trigger the information management module 232 to define a request for at least a portion of the confidential information 236. In some embodiments, one or more portions of the request can be automatically defined based on a request policy. In some embodiments, the request can be automatically defined based on a request policy after the subject entity 220 and the specific confidential information desired have been determined by the relying entity 200.

After the confidential information request has been defined, the confidential information request and/or one or more proposed responses to the confidential information request as defined by the information management module 232 based on the confidential information 236 can be sent (line T2) to the subject entity 220. For example, queries within the confidential information request and proposed responses to the queries can be sent to the subject entity 220.

Although not shown, in some embodiments, the confidential information request can be defined by the relying entity 200 based on one or more predefined queries. In some embodiments, the predefined queries can be defined based on one or more preferences (e.g., preferences included in a request policy) defined by the subject entity 220. For example, the subject entity 220 can be configured to allow, based on a set of preferences, the relying entity 200 to select only a subset of possible predefined queries related to the confidential information 236. The preferences can be stored at, for example, the memory 234 and accessed by the information management module 232.

The subject entity can respond (line T3) to one or more portions of the confidential information request and/or one or more proposed responses to the confidential information request. In some embodiments, the subject entity 220 can be configured to process (e.g., approve, deny, and/or modify) any combination of one or more portions of the confidential information request and one or more portions of a proposed responses to the confidential information request. In some embodiments, the processing can be automatically performed based on a response policy.

The information management module 232 can be configured to trigger (line T4) sending of the portion of the confidential information 236 (or proposed response(s) to the confidential information request) to the relying entity (line T5) if at least a portion of the confidential information request has been approved (line T3). Although not shown, in some embodiments, the relying entity 200 can be notified that one or more portions of the confidential information request has been approved, denied and/or modified by the subject entity 220.

In some embodiments, the relying entity 200 and/or subject entity 220 can engage in a negotiation process (e.g., iterative negotiation process) with respect to the confidential information request and/or proposed responses to the confidential information request. For example, the subject entity 220 can receive a query and associated proposed response to the query within a confidential information request. The query and the associated proposed response to the query can be defined, in part, by the information management module 232. If the subject entity 220 denies the query and disallows sending of the proposed response to the query, the information management module 232 can be configured to notify the relying entity 200 of the denial. In response, the relying entity 200 can trigger defining and sending of a modified confidential information request to the subject entity 220. The information management module 232 can be configured to send the modified confidential information request and proposed response to the modified confidential information request to the subject entity 220 for further processing (e.g., approval).

Figure 3:
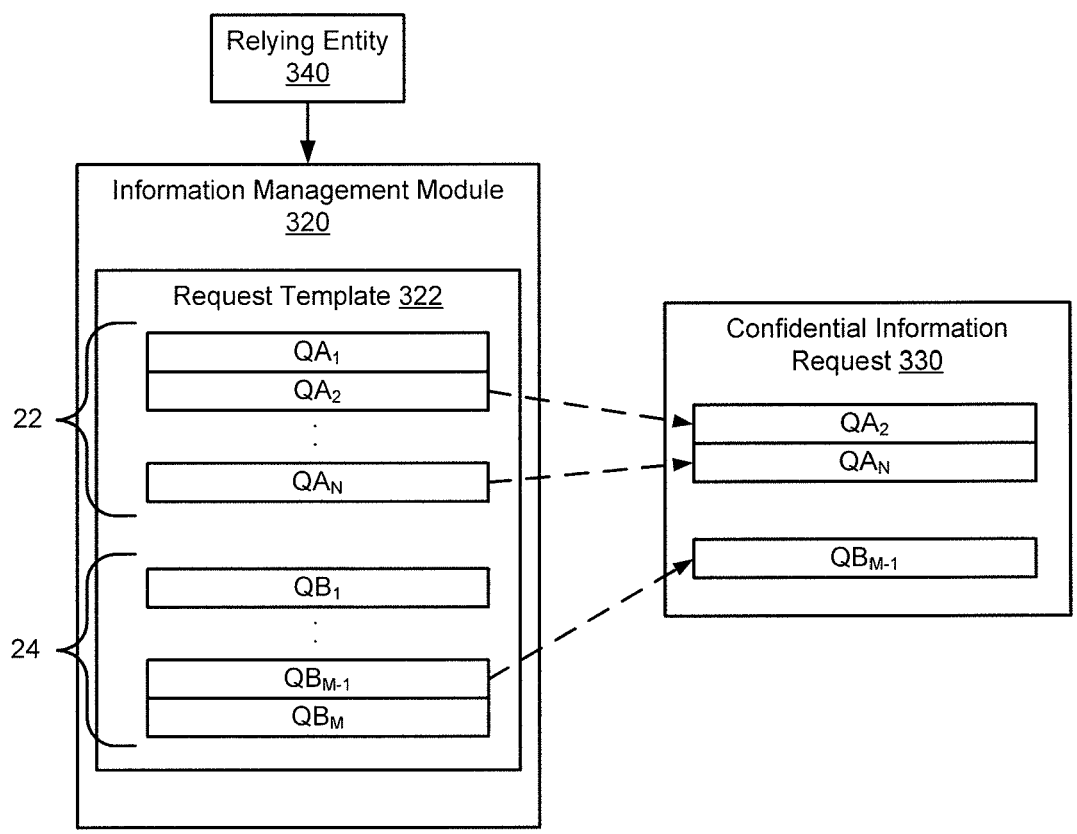
FIG. 3 is a schematic block diagram that illustrates predefined queries within a request template, according to an embodiment.

FIG. 3 is a schematic block diagram that illustrates predefined queries within a request template 322, according to an embodiment. As shown in FIG. 3, the request template 322 includes predefined query set 22 that includes predefined queries $QA_1$ through $QA_N$ and predefined query set 24 that includes predefined queries $QB_1$ through $QB_M$. A predefined query can be a predefined question (e.g., a true/false question, an open-ended question, a query for specific information) related to confidential information about a subject entity. In some embodiments, the predefined query can include a checklist of items or issues. In some embodiments, the predefined query sets can include one or more predefined queries. In some embodiments, one or more of the predefined queries can be defined by a subject entity (not shown), the relying entity 340, and/or an information provider (not shown). In some embodiments, one or more of the predefined queries can be a standard query from a pool or library of predefined queries.

As shown in FIG. 3, a confidential information request 330 that includes predefined query $QA_2$, predefined query $QA_N$, and predefined query $QB_{M-1}$ is defined in response to a signal from a relying entity 340. Specifically, the relying entity 340 can select the predefined queries from the sets of predefined queries to define the confidential information request 330. Although not shown, the confidential information request 330 can be sent to a subject entity for processing (e.g., approval, disapproval). Although not shown, in some embodiments, the request template 322 can have more or less predefined query sets than those shown in FIG. 3. The predefined query set 22 and the predefined query set 24 can be selected by the relying entity 340 from a library of predefined query sets (not shown).

In some embodiments, each set of predefined queries can be related to a specific type of confidential information. For example, predefined query set 22 can be related to an age of a person and predefined query set 24 can be related to a medical condition of a person. In some embodiments, one or more predefined queries from predefined query set 22 and one or more predefined queries from predefined query set 24 can be related to similar or the same type of confidential information.

In some embodiments, each set of predefined queries can have queries related to different privacy levels and/or levels of specificity. For example, predefined query $QA_1$ and predefined query $QA_2$ can be associated with different privacy levels. In some embodiments, for example, the predefined queries within predefined query set 22 can increase in privacy level from predefined query $QA_1$ (most invasive) to predefined query $QA_N$ (least invasive). In some embodiments, for example, predefined query $QA_1$ can be a question asking for information about whether or not an individual is greater than 21 years old, while predefined query $QA_2$ can be a question asking for a birth date of the individual. In this case, predefined query $QA_1$ is a less specific predefined query (less invasive) than predefined query $QA_2$ (more invasive).

In some embodiments, the confidential information request 330 can be defined based on a request policy (not shown) defined by the relying entity 340 (also can be referred to as a relying entity request policy). For example, the request policy can be configured to trigger the information management module 320 to automatically define the confidential information request based on only predefined query set 22 and/or based only predefined queries associated with, for example, a particular privacy level.

In some embodiments, a request policy can be configured to trigger the information management module 320 to request updates of confidential information based on specified predefined queries at specified times, at regular times, and/or at random times. In some embodiments, this type of request policy can be referred to as an update policy. The update requests can be defined by the information management module 320 based on the request policy and can be update requests targeted to the relying entity 340, a subject entity (not shown) and/or a third party (not shown). In some embodiments, an update policy can be defined by the relying entity 340 and/or a subject entity (not shown).

As shown in FIG. 3, the request template 322 is included in an information management module 320. In some embodiments, the request template 322 can be included in a memory (not shown) at or separate from the information management module 320 that can be accessed by the information management module 320.

In some embodiments, a request policy associated with (e.g., defined by) a subject entity can be configured to prevent specified predefined queries from being selected by the relying entity 340 (or a request policy associated with the relying entity 340). A request policy associated with a subject entity can be referred to as a subject entity request policy and a request policy associated with the relying entity can be referred to as a relying entity request policy. For example, the information management module 320 can be configured to provide only specified predefined queries (e.g., predefined query sets and/or predefined queries) to a relying entity 340 for possible selection based on a request policy. In some embodiments, for example, the request policy can be defined so that specified predefined queries are provided to the relying entity 340 based on a trust level (e.g., a specified assurance level, a specified level of authentication, a high security access level) associated with the relying entity 340 and/or based an entity type (e.g., hospital, government agency, trusted partner, acquaintance, private unknown individual, internet vendor) associated with the relying entity 340.

In some embodiments, the information management module 320 can be configured to notify the relying entity 340 that specified predefined queries cannot be selected based on a specified trust-level value (e.g., assurance level value). In some embodiments, the trust-level value can be determined based on an authentication process (e.g., based on authentication of the relying entity 340 with a specified security level attested by a digital certificate). In some embodiments, for example, if the relying entity 340 selects (or attempts to select) a particular predefined query for inclusion in the confidential information request 330, the information management module 320 can be configured to notify the relying entity 340 that the particular predefined query cannot be selected (or may be ignored by the subject entity) based on a request policy associated with the subject entity.

In some embodiments, the predefined queries provided to the relying entity 340 for possible selection can be determined (e.g., defined) based on a domain of confidential information. For example, only those predefined queries (e.g., predefined query sets and/or predefined queries from a predefined query set) that are related to a specified domain of confidential information can be provided to the relying entity 340 for selection in defining a confidential information request 330. In some embodiments, the predefined queries can be provided to the relying entity 340 for selection via a user interface such as a graphical user interface (not shown).

In some embodiments, the confidential information request 330 can include customized queries (not shown) in addition to predefined queries. The customized queries can be queries defined based on a module (e.g., a function) provided by the information management module 320. In some embodiments, a request for confidential information (not shown) can be defined by the relying entity 340 based entirely on customized queries that are not predefined.

Figures 4, 5:
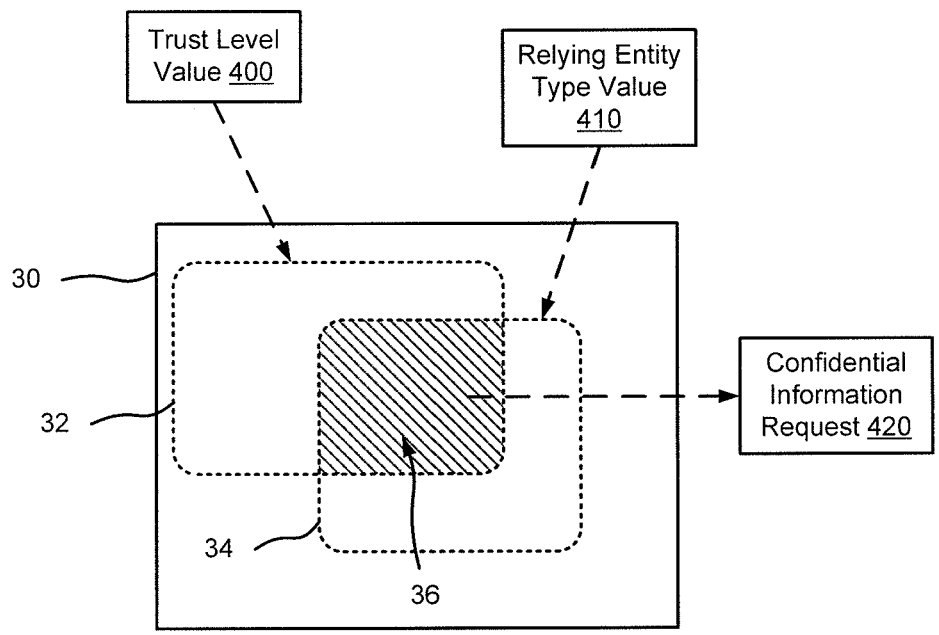
FIG. 4 is a schematic diagram that illustrates a domain of confidential information defined based on a trust-level value and a relying-entity-type value, according to an embodiment.
FIG. 5 is a diagram that illustrates a database that can be used to determine a domain of confidential information, according to an embodiment.

FIG. 4 is a schematic diagram that illustrates a domain of confidential information 36 defined based on a trust-level value 400 and a relying-entity-type value 410, according to an embodiment. The domain of confidential information 36 defines a subset of confidential information 30 that can be requested by a relying entity via a confidential information request 420. The trust-level value 400 and/or the relying-entity-type value 410 can be determined based on an identity of a relying entity.

As shown in FIG. 4, the domain of confidential information 36 is a subset of confidential information 30 that can be defined based on an intersection of a portion 32 of confidential information 30 associated with the trust-level value 400 and based on a portion 34 of the confidential information 30 associated with the relying-entity-type value 410. As shown in FIG. 4, a confidential information request 420 can be defined based on the domain of confidential information 36.

In some embodiments, for example, the portion 32 of the confidential information 30 can be associated with a first set of predefined queries and the portion 34 of the confidential information 30 can be associated with a second set of predefined queries. The intersection of the portion 32 of the confidential information 30 and the portion 34 of the confidential information 30 can be used to determine a third set of predefined queries. The third set of predefined queries can be provided (e.g., presented) to a relying entity and used by the relying entity to define the confidential information request 420.

In some embodiments, the confidential information 30 can be associated with one or more subject entities. In some embodiments, if associated with multiple subject entities, the domain of confidential information 36 can be further limited based on an identity of the subject entity.

In some embodiments, a domain of confidential information (not shown) can be determined based on a relying entity value alone or based on a trust-level value alone. In some embodiments, the domain of confidential information 36 can be determined based on a parameter value (e.g., a confidential information category value) in addition to the trust-level value 400 and the relying-entity-type value 410 shown in FIG. 4. More details related to confidential information category values are discussed in connection with FIG. 6. In some embodiments, the trust-level value 400 and/or the relying-entity-type value 410 can be predefined values that can be determined from a database (e.g., a look-up table) based on an identity (e.g., a name) of a relying entity. An example of such a database is shown in FIG. 5.

FIG. 5 is a diagram that illustrates a database 500 that can be used to determine a domain of confidential information, according to an embodiment. As shown in FIG. 5, a relying entity that has a specified relying-entity-type value (shown in column 520) and a specified trust-level value (shown in column 530) can be permitted to define a domain of confidential information related to one or more of the data types 450. Specifically, a relying entity that has a relying-entity-type value of A-2 (column 520) and a trust-level value of R (column 530) can be permitted to define a domain of confidential information 42 related to data type U2 and data type U3. The data type U2 and the data type U3, in this case, collectively define a domain of confidential information 42 for which the relying entity can define a confidential information request. In some embodiments, one or more of the data types 450 can be, for example a medical data type (related to medical information), a personal information data type, a financial data type (related to financial information), and so forth.

In some embodiments, the relying-entity-type value 520 and the trust-level value 530 can be determined based on an identity (e.g., a name) of the relying entity. The identity can be determined based on, for example, a digital signature, a username, an identifier, and so forth associated with the relying entity.

As shown in FIG. 5, the portion of confidential information can be defined based on relying-entity-type values 520 and trust-level values 530 associated with a specified subject entity 510. For example, a domain of confidential information associated with subject entity Y (column 510) when a relying entity has the relying-entity-type value of A-1 (column 520) and the trust-level value of Q (column 530) is different than a domain of confidential information associated with subject entity Y when the relying entity (or different relying entity) has the relying-entity-type value of A-2 (column 520) and the trust-level value of R (column 530).

As shown in FIG. 5, the domain of confidential information associated with subject entity X is the same no matter what the relying-entity-type value 520 or trust-level value 530 which are both shown with the wildcard value "*". In this case, all data types associated with subject entity X are eligible to be requested in a confidential information request by a relying entity.

Figure 6:
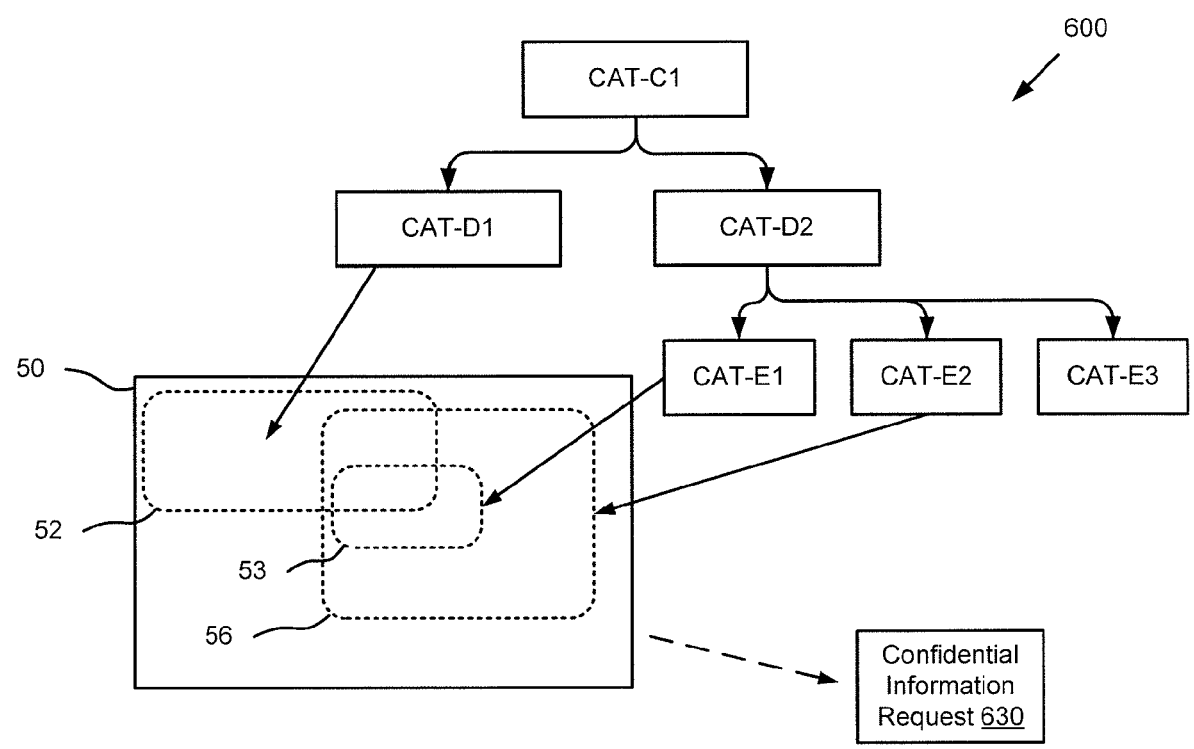
FIG. 6 is a schematic block diagram that illustrates portions of confidential information that are associated with hierarchically related confidential information categories, according to an embodiment.

FIG. 6 is a schematic block diagram that illustrates portions of confidential information 50 that are associated with hierarchically related confidential information categories, according to an embodiment. As shown in FIG. 6, confidential information categories CAT-E1, CAT-E2, and CAT-E3 are hierarchically (e.g., ancestrally) related to CAT-D2. Specifically, confidential information category CAT-D2 is a parent category of confidential information categories CAT-E1, CAT-E2, and CAT-E3 (which can be referred to as child categories or as child confidential information categories). Also, as shown in FIG. 6, confidential information category CAT-C1 is hierarchically related to confidential information categories CAT-D2 and CAT-D1.

Relationships between at least some of the confidential information categories 600 and portions of the confidential information 50 are shown in FIG. 6. Specifically, confidential information category CAT-D1 is associated with portion 52 of confidential information 50, confidential information category CAT-E1 is associated with portion 53 of confidential information 50, and confidential information category CAT-E2 is associated with portion 56 of confidential information 50.

If the confidential information 50 is associated with a subject entity, the confidential information categories 600 can be navigated via, for example, a user interface (e.g., a user interface of a device such as a terminal device, a kiosk, and/or a processing device) by a relying entity to select a portion of confidential information associated with the subject entity. The portion of confidential information 50 can correspond with a domain of confidential information from which a confidential information request 630 can be defined. For example, confidential information request 630 can be defined based on one or more predefined queries associated with portion 56 of confidential information 50 (which can be associated with a subject entity) when confidential information category CAT-E2 is selected by, for example, a relying entity.

One or more of the confidential information categories can be, for example, a medical information category, a financial information category, and so forth. In some embodiments, the child categories can be subsets (e.g., species) of the parent categories. In some embodiments, confidential information categories that can be used to select a portion of confidential information (e.g., define a domain of a confidential information) may not be hierarchically related. In some embodiments, the confidential information 50 can be related to more than one subject entity. Accordingly, the confidential information categories 600 can be used to define a domain of confidential information associated with more than one subject entity. In some embodiments, multiple confidential information categories can be selected and the intersection of portions of confidential information can define a domain of confidential information.

In some embodiments, the hierarchical structure of the confidential information categories 600 can be defined based on an identity of a subject entity. For example, a set of confidential information categories associated with a first subject entity can be different than a set of confidential information categories associated with a second subject entity because the confidential information available in, for example, a database for the first subject entity can be different than the confidential information available for the second subject entity.

In some embodiments, a domain of confidential information can be determined based on a parameter value in addition to one or more of the confidential information categories 600. For example, a domain of confidential information can be defined based on one or more of the confidential information categories as well as based a trust-level value and/or a relying-entity-type value.

Figure 7:
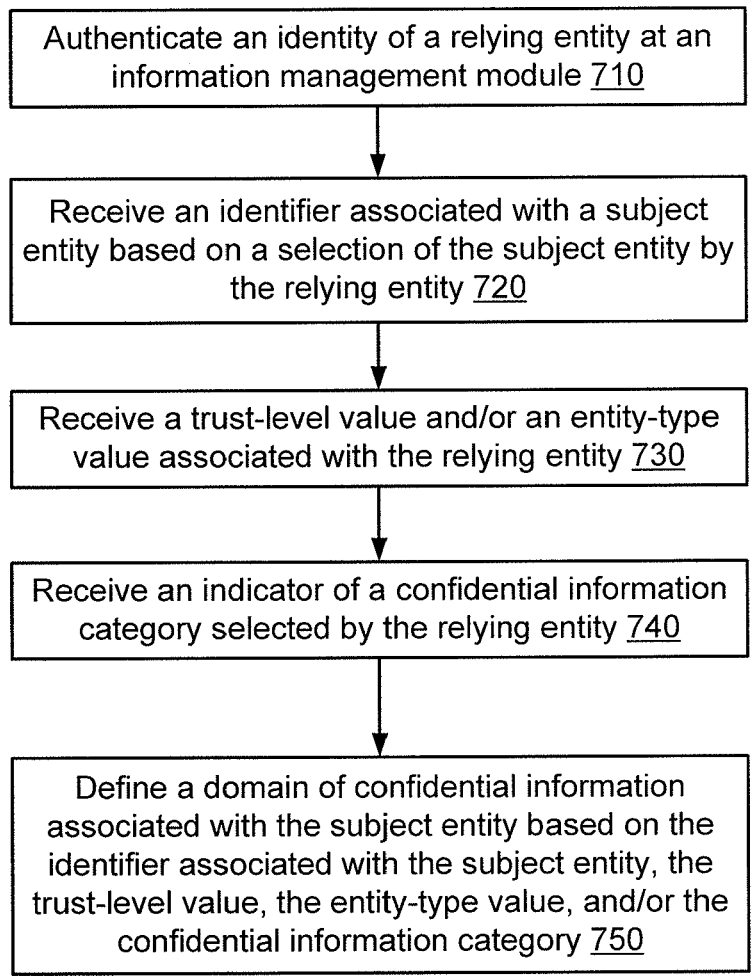
FIG. 7 is a flowchart that illustrates a method for defining a domain of confidential information, according to an embodiment.

FIG. 7 is a flowchart that illustrates a method for defining a domain of confidential information, according to an embodiment. As shown in FIG. 7, an identity of a relying entity is authenticated at an information management module at 710. The identity of the relying entity can be authenticated based on, for example, one or more digital certificates and/or a username/password combination. In some embodiments, the relying entity can be authenticated based on a credential associated with the relying entity. More details related to authentication based on a credential are set forth in U.S. patent application publication No. 2010/0116880, which has been incorporated herein by reference in its entirety. In some embodiments, the information management module can be, for example, associated with a network-based (e.g., web-based) application. In some embodiments, the information management module can be associated with an information provider.

An identifier associated with a subject entity is received based on a selection of the subject by the relying entity at 720. The relying entity can select the specified subject entity because the relying entity is interested in requesting confidential information related to the subject entity. In some embodiments, the selection of the subject entity can be performed via a processing device (e.g., a kiosk, a computing device) associated with the information management module. In some embodiments, the subject entity can be automatically selected based on a request policy defined by the relying entity. In response to the selection of the subject entity, the identifier can be received at the information management module.

A trust-level value and/or an entity-type value associated with the relying entity is received at 730. In some embodiments, the trust-level value and/or the entity-type value can be determined based on an identity associated with the relying entity. In some embodiments, the identity of the relying entity can be determined (e.g., acquired, ascertained) when the relying entity is authenticated at 710. In some embodiments, the trust-level value and/or the entity-type value can be determined based on entries included in a database.

An indicator of a confidential information category that has been selected by the relying entity is received at 740. The confidential information category can be selected by the relying entity via a processing device associated with, for example, the information management module. In some embodiments, the confidential information category can be automatically selected based on a request policy defined by the relying entity. In some embodiments, the automatic selection of the confidential information category can be determined based on the identity of the subject entity. In some embodiments, more than one confidential information category can be selected.

A domain of confidential information associated with the subject entity is defined based on the identifier associated with the subject entity, the trust-level value, the entity-type value, and/or the confidential information category at 750. The domain of confidential information, from which a confidential information request can be defined, can be determined based on one or more of the identifier associated with the subject entity, the trust-level value, the entity-type value, and/or the confidential information category. In some embodiments, the domain of confidential information can be partially defined by the identifier associated with the subject entity and based on the trust-level value, and not based on the entity-type value or the confidential information category. In some embodiments, the domain of confidential information can be defined based on a request policy defined by the subject entity and/or a request policy defined by the relying entity.

Figure 8:
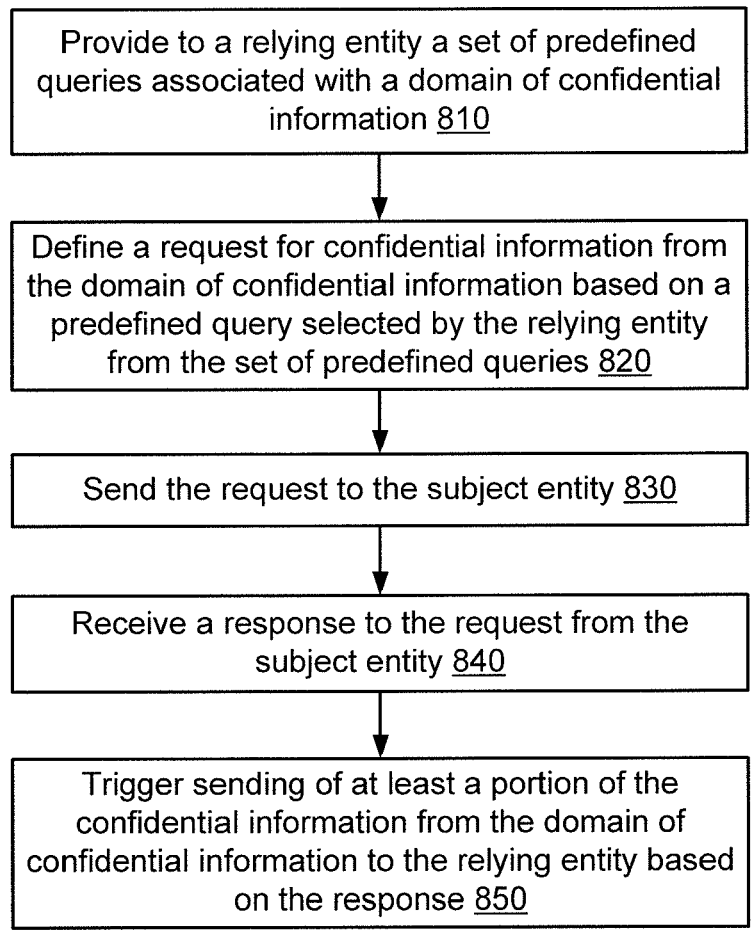
FIG. 8 is a flowchart that illustrates a method for receiving a response to a request for confidential information from a subject entity, according to an embodiment.

FIG. 8 is a flowchart that illustrates a method for receiving a response to a request for confidential information from a subject entity, according to an embodiment. As shown in FIG. 8, a set of predefined queries associated with a domain of confidential information is provided to a relying entity at 810. The predefined queries can be provided to the relying entity via a processing device (e.g., a kiosk, a computing device) associated with an information management module such that one or more of the predefined queries can be selected. In some embodiments, the information management module can be associated with an information provider.

In some embodiments, the domain of confidential information can be defined based on a method such as that described in connection with FIG. 7. In some embodiments, the predefined queries can be defined based on a request policy defined by the subject entity and/or the relying entity. In some embodiments, the predefined queries can be defined based on a trust-level value, an entity-type value, and/or an identity of the relying entity. For example, one or more predefined queries can be provided to the relying entity for selection based on a trust-level value associated with the relying entity.

A request for confidential information from the domain of confidential information is defined based on a predefined query selected by the relying entity from the set of predefined queries at 820. In some embodiments, the predefined query can be selected based on a request policy defined by the relying entity. For example, the predefined query can be selected based on an identity of the subject entity and/or based on a preference (of the relying entity) related to a privacy level associated with the predefined query.

The request can be sent to the subject entity at 830. In some embodiments, the request can be sent to the subject entity via, for example, an e-mail or an alert to a client module (e.g., a software module). In some embodiments, the subject entity can be notified that a request has been defined by the relying entity. In some embodiments, the subject entity can be provided with the details of the request via, for example, a computing device. In some embodiments, the subject entity can be authenticated (e.g., authenticated via one or more a digital certificates, authenticated based on a username/password combination) before being permitted to access details related to a request at, for example, an information management module. In some embodiments, the subject entity can be authenticated based on a credential associated with the subject entity. More details related to authentication based on a credential are set forth in U.S. patent application publication No. 2010/0116880, which has been incorporated herein by reference in its entirety.

A response to the request is received from the subject entity at 840. In some embodiments, the response can be a modification of at least a portion of the request. In some embodiments, the response can include a denial of at least a portion of the request (e.g., one or more portions of one or more predefined queries). In some embodiments, the response can include an approval of at least a portion of the request (e.g., one or more portions of one or more predefined queries).

Although not shown, in some embodiments, a proposed response to the request can be defined and sent to the subject entity for a response (e.g., approval, modification, denial). In some embodiments, the response (of the subject entity) to the proposed response (defined by the information management module) can be defined based on a response policy defined by the subject entity. For example, the response policy can be defined such that only specified types of confidential information can be accessed by the relying entity based on, for example, a trust-level value associated with the relying entity or an identity of the relying entity. In some embodiments, the response policy can include a default option for allowing a relying entity to access confidential information associated with a subject entity.

Figure 9:
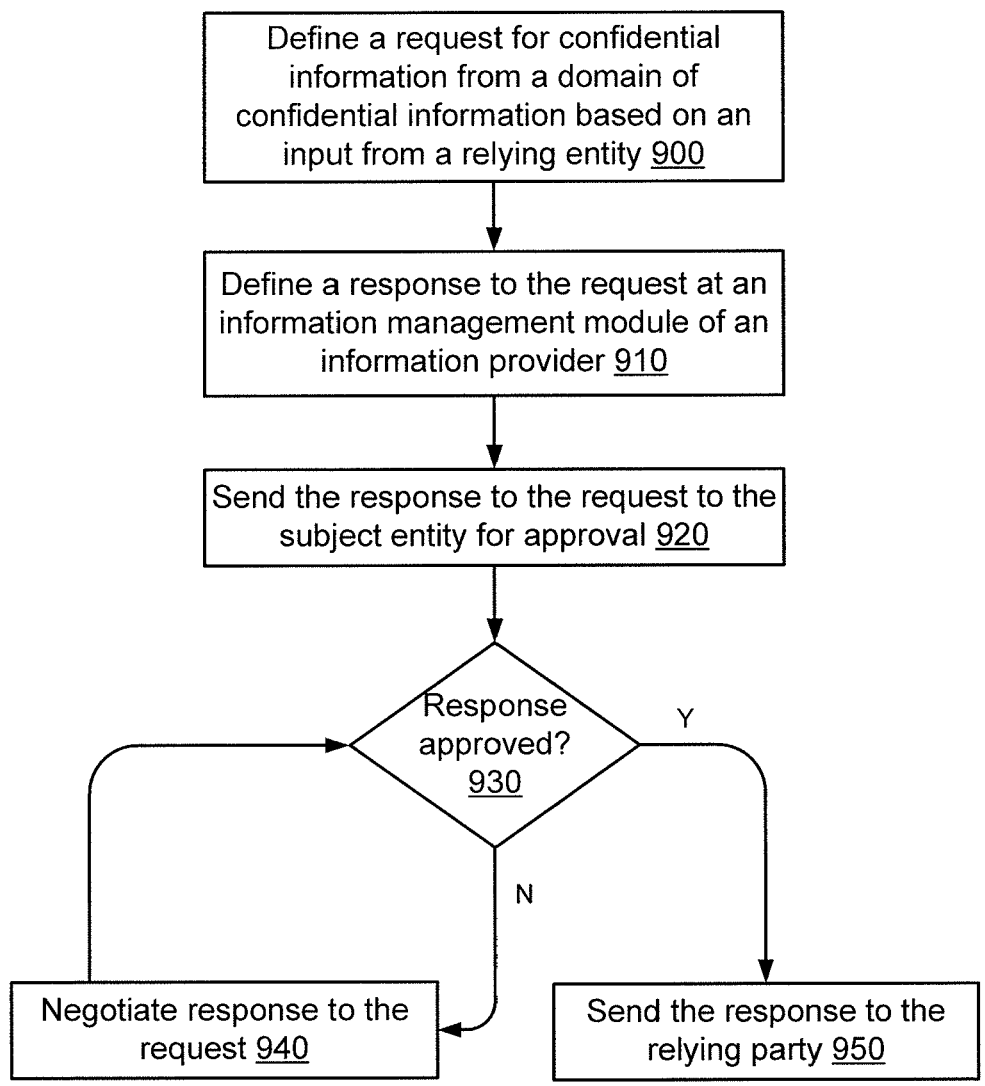
FIG. 9 is a flowchart that illustrates a method for negotiating a response related to a confidential information request, according to an embodiment.

FIG. 9 is a flowchart that illustrates a method for negotiating a response related to a confidential information request, according to an embodiment. As shown in FIG. 9, a request for confidential information from a domain of confidential information is defined based on an input from a relying entity at 900. In some embodiments, the input can be a selection of a predefined query. In some embodiments, the input can be a customized query.

A response to the request is defined at an information management module of an information provider at 910. In some embodiments, the response can be defined based on a response policy defined by a subject entity. In some embodiments, the response can be referred to as a proposed response.

The response to the request is sent to the subject entity for approval at 920. In some embodiments, the response to the request can be sent to the subject entity for approval before, after, or along with the request for the confidential information from the domain of confidential information.

If the response is approved at 930, the response to the request is sent to the relying party at 950. If the response is not approved, the response to the request can be negotiated at 940. In some embodiments, the negotiation can take place between the subject entity with the relying entity via the information management module. In some embodiments, if the request is defined based on predefined queries, one or more predefined queries can be removed, added, and/or modified during a negotiation process. Also, in some embodiments, one or more proposed responses can be removed, added, and/or modified during a negotiation process. In some embodiments, both the subject entity and the relying entity can be informed that negotiation of the response to the request will take place off-line (e.g., between the parties without the assistance of the information management module).

Although not shown, in some embodiments, one or more queries within the request can be negotiated instead of the response to the request. In such cases, the response can also be modified based on the change(s) to the queries within the request. In some embodiments, both the request and response to the request can be negotiated.

Figure 10:
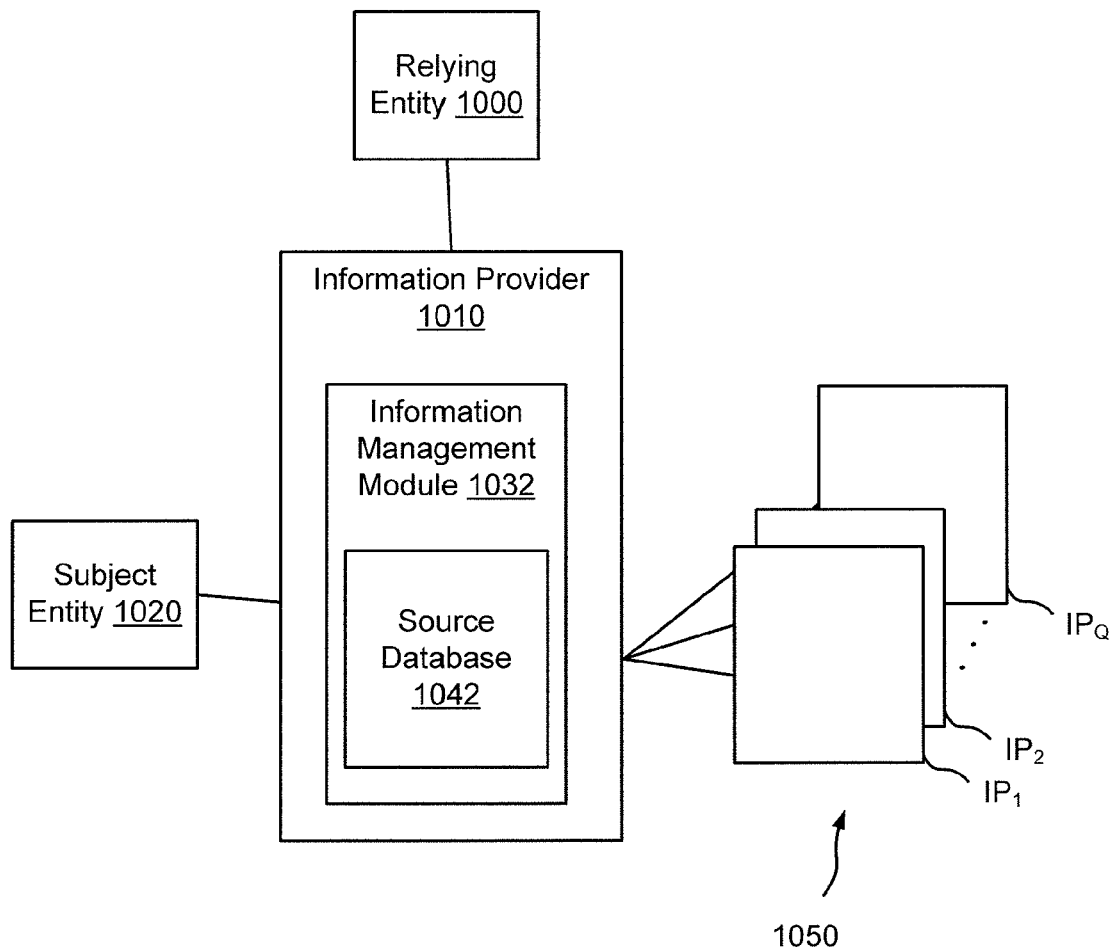
FIG. 10 is a schematic diagram that illustrates sources associated with an information provider, according to an embodiment.

FIG. 10 is a schematic diagram that illustrates sources 1050 associated with an information provider 1010, according to an embodiment. The sources 1050 include sources $IP_1$ through $IP_Q$. The sources can be configured to share confidential information such as account information, personal information, and so forth to a relying entity 1000 via the information provider 1010 when the sharing of the confidential information is approved by the subject entity 1020. As shown in FIG. 10, the information provider 1010 can have an information management module 1032. The information management module 1032 can have a source database 1042.

The subject entity 1020 can be configured to select one or more of the sources 1050 for sharing confidential information with the relying entity 1000 via the information management module 1032. Specifically, the information management module 1032 can be configured to provide a subject entity 1020 with one or more options so that the subject entity 1020 can select one or more of the sources 1050 to respond to a request for confidential information. The options can be determined based on entries included in the source database 1042. For example, the subject entity 1020 can select source $IP_1$ rather than any of the other sources 1050 (which could also provide an appropriate response) as a source of confidential information defined within a response to a request for confidential information from the relying entity 1000. Source $IP_1$ can be provided as a potential source of confidential information based on an entry included in the source database 1042.

In some embodiments, the source can be determined based on a response policy defined by the subject entity 1020. In some embodiments, one or more of the sources 1050 can be associated with different reliability values. For example, source $IP_1$ can be considered a more reliable source than source $IP_2$ based reliability values that are respectively associated with each. In some embodiments, the relying entity 1000 can define a request policy that specified that only responses to requests for confidential information will be accepted from only one or more of the sources 1050.

Figure 11:
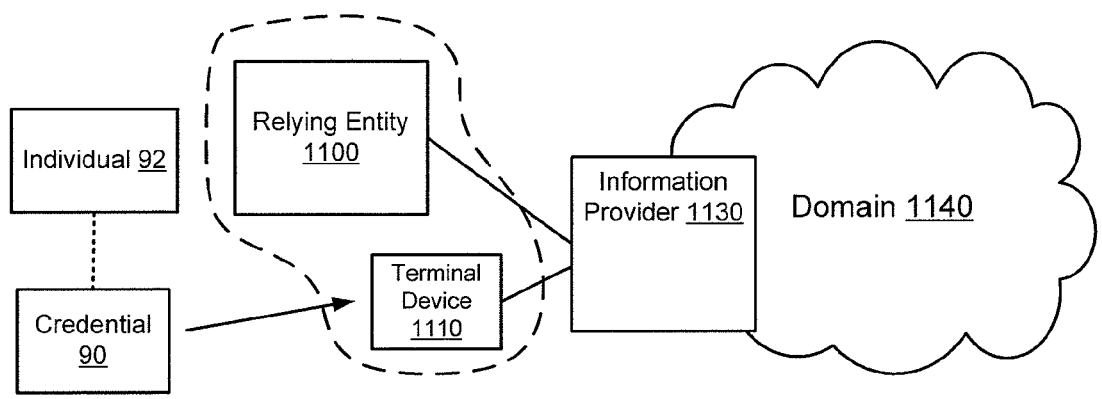
FIG. 11 is a schematic block diagram that illustrates a terminal device configured to receive credential data from a credential, according to an embodiment.

FIG. 11 is a schematic block diagram that illustrates a terminal device 1110 configured to receive credential data from a credential 90, according to an embodiment. The credential data can be used by the terminal device 1110 to, for example, authenticate an identity of an individual 92 (also can be referred to as credential owner) and/or determine an authenticity of the credential 90. In some embodiments, the identity of the individual 92 can be authenticated based on credential data such as credential-owner authentication information (e.g., a personal identification number (PIN), information related to a characteristic of the individual 92 (e.g., biometric information)). The credential data from the credential 90 can be processed during an authentication process. In some embodiments, the authenticity of the credential 90 can be determined based on credential data such as credential-issuer validation information (e.g., a digital certificate associated with an issuer of the credential 90).

As shown in FIG. 11, the terminal device 1110 is in communication with an information provider 1130 associated with domain 1140. A request for confidential information, defined by the relying entity 1100, from the information provider 1130 can be accessed by the individual 92 at the terminal device 1110 after an authentication process performed at the terminal device 1110. The confidential information can be associated with the individual 92. In some embodiments, the individual 92 can be referred to as a subject individual or as a subject entity.

In some embodiments, the individual 92 can be denied access to process the request (e.g., approve, deny, modify, and/or negotiate the request) for confidential information unless access has been granted to the individual 92 via the authentication process. In some embodiments, the individual 92 can be permitted to access confidential information maintained by the information provider 1130 via the terminal device 1110 after access has been granted to the individual 92 via the authentication process. In some embodiments, one or more policies (e.g., update policy, response policy) can be accessed (e.g., modified) only after successfully completing the authentication process.

In some embodiments, the relying entity 1100 can have a credential (not shown) that can be used during an authentication process. In some embodiments, for example, the relying entity 1100 can be permitted to make a request for confidential information based on an authentication process at terminal device 1110 or a different terminal device (not shown). More details related to authentication based on a credential and terminal devices are set forth in U.S. patent application publication No. 2010/0116880, which has been incorporated herein by reference in its entirety.

Although not shown, in some embodiments, the terminal device 1110 can be configured to communicate (e.g., communicate via a network) with an identity database associated with the individual 92. The individual 92 can access and select an identity (e.g., an alias) from the identity database via the terminal device 1110. The individual 92 can also trigger sending of the selected identity to the relying entity 1100 from the identity database via the terminal device 1110. In other words, the individual 92 can assert an identity to the relying entity 1100 via the terminal device 1110. The individual 92 can maintain several aliases in the identity database. This type of architecture can enable the individual 92 to use, for example, a specified alias (e.g., an alias associated with a specified e-mail address and/or mailing address) when transacting with an unknown vendor (e.g., an unknown relying entity) and another alias (e.g., an alias with a different email address and/or different mailing address) when transacting with a trusted vendor (e.g., a trusted/known relying entity). In this way, for example, the individual can prevent, or substantially prevent, possible spam from the unknown vendor from reaching, for example, a specified (e.g., a preferred) email address, which may be shared only with trusted vendors.

Some embodiments described herein relate to a computer storage product with a computer-readable medium (also can be referred to as a processor-readable medium) having instructions or computer code thereon for performing various computer-implemented operations. The media and computer code (also can be referred to as code) may be those designed and constructed for a specific purpose or purposes. Examples of computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave processing systems; and hardware devices that are specially configured to store and execute program code, such as Application-Specific Integrated Circuits (ASICs), Programmable Logic Devices (PLDs), and Read-Only Memory (ROM) and Random-Access Memory devices. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

While various embodiments have been described above, it should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described. For example, in some embodiments, a request can be approved (or can require approval) by multiple subject entities. In some embodiments, a portion of confidential information can be sent to multiple relying entities in response to a request for confidential information.

What is claimed is:

1. A non-transitory processor-readable medium storing code representing instructions that when executed by a processor cause the processor to:
   define a domain of confidential information associated with a subject entity based on a confidential information category selected from a plurality of confidential information categories by a relying entity at a first device;
   provide, to the relying entity and from an information provider implemented at a second device different from the first device, a set of predefined queries associated with the domain of confidential information, the set of predefined queries being different from the plurality of confidential information categories and being approved by the subject entity at a third device different from the first device and the second device; and
   define at least a portion of a request for confidential information from the domain of confidential information based on at least one predefined query selected from the set of predefined queries by the relying entity.

2. The non-transitory processor-readable medium of claim 1, wherein at least a portion of the plurality of confidential information categories are hierarchically related.

3. The non-transitory processor-readable medium of claim 1, wherein the at least one predefined query includes a first predefined query associated with a first privacy level, the request is defined based on a second predefined query associated with a second privacy level different than the first privacy level.

4. The non-transitory processor-readable medium of claim 1, further storing code representing instructions that when executed by a processor cause the processor to:
   define a response to the request based on a preference defined by the subject entity.

5. The non-transitory processor-readable medium of claim 1, further storing code representing instructions that when executed by a processor cause the processor to:
   define a response to the request;
   send the response to the request to the subject entity; and
   receive approval of the response from the subject entity.

6. The non-transitory processor-readable medium of claim 1, further storing code representing instructions that when executed by a processor cause the processor to:
   define a response to the request;
   send the response to the request to the subject entity; and
   trigger a negotiation of the response based on at least a portion of the response being disapproved by the subject entity.

7. The non-transitory processor-readable medium of claim 1, wherein at least a portion of the domain of confidential information has been updated based on an update policy defined by the subject entity.

8. The non-transitory processor-readable medium of claim 1, wherein the at least one predefined query is associated with a privacy level,
   the processor-readable medium further storing code representing instructions that when executed by a processor cause the processor to:
   define a response to the request based on a comparison of the privacy level with a privacy level threshold defined by the subject entity.

9. The non-transitory processor-readable medium of claim 1, further storing code representing instructions that when executed by a processor cause the processor to:
   receive a response to the request from the subject entity; and
   send at least a portion of the confidential information from the domain of confidential information to the relying entity based on the response.

10. The non-transitory processor-readable medium of claim 1, wherein the set of predefined queries is selected from a plurality of predefined queries based on at least one of a trust-level value or an entity-type value associated with the relying entity.

11. The non-transitory processor-readable medium of claim 1, further storing code representing instructions that when executed by a processor cause the processor to:
    authenticate an identity of the subject entity; and
    authenticate an identity of the relying entity.

12. The non-transitory processor-readable medium of claim 1, wherein the request is defined based on a customized query defined by the relying entity.

13. The non-transitory processor-readable medium of claim 1, wherein the confidential information includes at least one of financial information, medical information, or personal information.

14. A method implemented in a memory or a processing device, comprising:
    receiving, at an information provider implemented in at least one of a memory or a processing device, a trust-level value and an entity-type value associated with a relying entity;
    determining, based on the trust-level value and the entity-type value, that the relying entity has authorization to request confidential information from a domain of confidential information, the domain of confidential information defining a subset of confidential information from a set of confidential information associated with a subject entity, the information provider being controlled by a third party different from the relying entity and the subject entity; and
    defining, at the information provider, at least a portion of a request for confidential information from the subset of confidential information based on predefined query selected (1) by the relying entity at a first device and (2) from a plurality of predefined queries approved by the subject entity at a second device different from the first device, each predefined query from the plurality of predefined queries configured to elicit confidential information from the subset of confidential information.

15. The method of claim 14, wherein the predefined query is included in the plurality of predefined queries based on content included in the domain of confidential information.

16. The method of claim 14, wherein the predefined query is a first predefined query, the defining includes defining the request based on a second predefined query selected by the relying entity from the plurality of predefined queries, the second predefined query is associated with the domain of confidential information.

17. The method of claim 14, wherein the determining includes determining based on a confidential information category selected by the relying entity, the confidential information category being different than the plurality of predefined queries.

18. The method of claim 14, wherein each predefined query from the plurality of predefined queries is ordered based on a privacy level.

19. The method of claim 14, wherein the defining is based on an identity of the subject entity.

20. The method of claim 14, wherein each query from the plurality of predefined queries is included in a request template.

21. A method comprising:
receiving, from a first device associated with a subject entity and at an information provider implemented in at least one of a memory or a processor of a second device different from the first device, a response policy associated with disclosure of confidential information of the subject entity;
determining, based on the response policy, that a relying entity has authorization to request confidential information from a domain of confidential information associated with the subject entity;
providing, based on the response policy, a plurality of predefined queries associated with the domain of confidential information to a third device (1) associated with the relying entity and (2) different from the first device and the second device, the domain of confidential information being associated with the subject entity, each predefined query from the plurality of predefined queries being approved by the subject entity and configured to elicit confidential information from the domain of confidential information; and
defining at least a portion of a request for confidential information from the domain of confidential information based on a predefined query when the predefined query is selected from the plurality of predefined queries by the relying entity.

22. The method of claim 21, further comprising:
triggering the information provider to send at least a portion of the confidential information from the domain of confidential information, the information provider being selected by the subject entity.

23. The method of claim 21, wherein the providing includes providing based on at least one of a trust-level value or an entity-type value associated with the relying entity.

24. The method of claim 21, further comprising:
receiving, from the third device associated with the relying entity, an indication of a confidential information category associated with the domain of confidential information and selected from a plurality of confidential information categories by the relying entity.

25. The method of claim 24, wherein the input from the relying entity includes an indication of a confidential information category selected from a plurality of confidential information categories by the relying entity.

26. A method, comprising:
defining a request for confidential information from a domain of confidential information based on an input from a relying entity at a first device, the domain of confidential information being associated with a subject entity;
defining a response to the request at an information provider at a second device different from the first device; and
sending, via a communication network, the response to the relying entity when the response has been approved, subsequent to the defining the request, by the subject entity at a third device different from the first device and the second device.

27. The method of claim 26, further comprising:
receiving, via the communication network, an indicator that the subject entity has disapproved of at least a portion of the response; and
modifying the response in response to the indicator.

28. The method of claim 26, wherein the domain of confidential information is defined based on a selection by the relying entity.

29. The method of claim 26, wherein the response is a first response,
the method further comprising:
receiving an update policy defined by the subject entity;
sending an update request to at least one of the subject entity or the relying party based on the update policy;
receiving a second response different from the first response in response to the update policy; and
modifying at least a portion of the domain of confidential information based on the second response.

30. The method of claim 26, wherein the response is a first response,
the method further comprising:
receiving an update policy defined by the subject entity; and
sending to a subject entity a request for authorization to transmit an update request to the relying party based on the update policy.

31. A method, comprising:
defining, at an information provider implemented in at least one of a memory or a processor of a first device, a proposed response to a predefined query selected by a relying entity at a second device different from the first device, the proposed response being defined based on confidential information associated with an individual, the information provider being controlled by a third-party different from the relying entity and the individual;
authenticating an identity of the individual; and
sending, via a communication network, the proposed response to the relying entity in response to the proposed response being approved by the individual subsequent to the defining and based on the authenticating.

32. The method of claim 31, wherein the proposed response is defined based on a response policy associated with the individual.

33. The method of claim 31, wherein the authenticating includes authenticating based on a credential-owner authentication information associated with the individual.

34. The method of claim 31, further comprising:
authenticating a credential associated with the individual based on credential-issuer validation information associated with the credential.

35. The method of claim 31, wherein the proposed response to the predefined query is selected by the relying entity in response to the relying entity selecting a confidential information category from a plurality of confidential information categories.

\* \* \* \* \*